United States Patent Office 3,738,983
Patented June 12, 1973

3,738,983
PROCESS FOR THE PREPARATION OF 3-(3β,17β-DI-HYDROXYANDROST-5-EN - 17α-YL) PROPIONIC ACID γ-LACTONE
Hugh L. Dryden, Jr., Deerfield, and Joseph Wieczorek, Chicago, Ill., assignors to G. D. Searle & Co., Chicago, Ill.
No Drawing. Filed Aug. 6, 1971, Ser. No. 169,876
Int. Cl. C07c 173/00
U.S. Cl. 260—239.57                11 Claims

ABSTRACT OF THE DISCLOSURE

A new process for the preparation of 3-(3β,17β-dihydroxyandrost-5-en-17α-yl)propionic acid N-lactose from dehydroisoandrosterone is described herein. The procedure makes use of a 1-(lower alkoxy)ethyl group as a protecting group for hydroxy functions in the steroid molecule. Use of such a protecting group is advantageous in that it not only improves the yields in the overall process but it also gives intermediates which are much more soluble in the solvents used so that a greater throughput of material is possible with a resultant increase in efficiency.

---

Among the many steroids which have found substantial use as medicines themselves or as intermediates to other pharmacologically active substances is 3-(3β,17β-dihydroxyandrost - 5 - en-17α-yl)propionc acd γ-lactone. This compound itself possesses pharmacological activity but it can be further used to prepare other compounds such as 3-(17β-hydroxy-3-oxoandrosta-4,6-dien-17α-yl) propionic acid lactose (see U.S. Pat. 3,270,008) a compound useful for blocking the effects of desoxycorticosterone acetate on urinary sodium and potassium. This diene can be further reacted with thioacetic acid to give 3 - (7α-acetylthio-17β-hydroxy-3-oxoandrost-4-en-17α-yl) propionic acid lactose (see U.S. Pat. 3,013,012), an antimineralocorticoid also known as Spironolactone.

In one process presently used for preparing 3-(3β,17β-dihydroxyandrost-5-en-17α-yl)propionic acid γ-lactose, dehydroisoandrosterone is treated with potassium hydroxide and acetylene to give the corresponding 17α-ethynyl compound. Alternately, ethynyl-magnesium chloride is used to introduce the 17-ethynyl group. The resulting 17-ethynyl compound is then treated with methylmagnesium chloride to give the corresponding steroid-ethynyl Grignard reagent. This material is then treated with carbon dioxide to give the propiolic acid which is isolated as the triethylamine salt. Finally, the propiolic acid is reduced with palladium-on-carbon and lactonized to give the desired 3-(3β,17β-dihydroxyandrost-5-en-17α-yl)propionic acid γ-lactone.

While the above process has been used to prepare the desired lactone on a large scale, it is not completely satisfactory because the compounds involved in the synthesis contain hydroxy groups, first at C–3 and then at C–17. In the course of the reactions involved, metal alkoxides are thus formed and these are not particularly soluble in the reaction solvents used. As a result, it would be desirable to find a protecting group which would serve to prevent the formation of alkoxides and which could be readily introduced and removed from the steroid molecule. Thus, it has now been found that a 1-(lower alkoxy)ethyl group is particularly useful as a protecting group for the hydroxy functions in the reaction sequence described above. The lower alkoxy groups contain up to six carbon atoms and can be illustrated by methoxy, ethoxy, butoxy, and isobutoxy.

The indicated protecting group is particularly advantageous in that it is formed readily by the reaction of an alcohol with a (lower alkyl) vinyl ether in the presence of a trace of acid. In these ethers, the lower alkyl group contains up to six carbon atoms and examples of useful ethers are methyl vinyl ether, ethyl vinyl ether, butyl vinyl ether, and isobutyl vinyl ether. Actually, the resulting protected compounds are mixed acetals of acetaldehyde and the protecting group can be removed readily when this is desired. The indicated intermediates are further advantageous in that they are much more soluble in the reaction solvents used than are the intermediates previously used. Specifically, the indicated protecting groups increase the solubility several-fold, up to a maximum of about 5-times. The steroid intermediates protected in this way have further been found to be beneficial in that increased yields are obtained overall and faster reaction times are possible. Obviously too, with the increased solubility of the intermediates, less solvent is needed to carry out the process and the volume of material to be manipulated is reduced substantially for the same throughput of steroid material.

More specifically, the present process involves the reaction of dehydroisoandrosterone with an alkyl vinyl ether under slightly acidic conditions. Methanesulfonic acid is particularly useful for this purpose although other acids of similar strength can be used. The resulting product is a 3β-[1-(lower alkoxy)ethoxy]-androst-5-en-17-one. This material is then ethynylated at the 17-position by the use of powdered potassium hydroxide and acetylene in a mixture of tetrahydrofuran and ethanol. This gives a 3β-[1-(lower alkoxy)ethoxy]-17α-ethynylandrost-5-en17β-ol. A second 1-(lower alkoxy)-ethoxy group is then introduced at the 17-position in the same manner as described earlier to give the corresponding bis-1-(lower alkoxy)ethoxy compound.

The bis-1-(lower alkoxy)ethoxy compound is then reacted with methylmagnesium chloride in tetrahydrofuran to give the steroid-ethynyl Grignard. The methyl Grignard reagent is added to the steroid in solution at 45–60° C. and the mixture is then heated to reflux to complete the reaction. The Grignard solution is then cooled to −10 to 25° C. and carbon dioxide is bubbled into the solution, with the temperature preferably maintained at 5–25° C. The two protecting groups are then removed by treating the product with a slight excess of aqueous hydrochloric acid or a similar strong acid. This reaction is preferably carried out in the presence of 2-methyl-2,4-pentanediol which readily forms a stable cyclic acetal with the acetaldehyde released during the removal of the blocking group. In this way, possible side reactions with the acetaldehyde are then avoided. The product obtained in this way is 3-(3β,17β-dihydroxyandrost-5-en-17α-yl) propiolic acid and it is usually conveniently isolated as the triethylamine salt. The acid salt is then hydrogenated using palladium-on-calcium carbonate as a catalyst. This gives the desired propionic acid which is then readily lactonized by acidificaton. During the first stages of the reduction, the mixture is preferably maintained at about 0–12° C. This helps to avoid undesired reduction of the 5,6-double bond.

While any (lower alkyl) vinyl ether such as ethyl vinyl ether, n-butyl vinyl ether, and isobutyl vinyl ether, can be used to introduce the blocking groups in the above process, butyl vinyl ether is particularly preferred for this purpose because this material is readily available and has physical properties which make its use in the process particularly convenient. It is further noted that, while it may be simplest to use the same blocking group for the 3- and the 17-hydroxy groups, there is no reason for these two groups to be identical since they are usually introduced into the steroid molecule separately at different times.

Furthermore, while a particularly preferred series of reactions for carrying out the process has been described above, the present overall process should not be considered as limited thereby. Thus, other known methods can be used in the various steps. For example, it is possible to introduce the 17-ethynyl group by means of a Grignard reagent such as ethynylmagnesium chloride or by the corresponding lithium derivative, or by using sodium acetylide and liquid ammonia. Furthermore, it is possible to use the lithium or other metal derivative of the ethynyl steroid in the carbonation process. Finally, while palladium-on-calcium carbonate is a preferred catalyst in the reduction of the propiolic acid, it is also possible to use palladium-on-charcoal or other catalysts at this particular stage.

Yet another possible variation in the present process would be to remove the protecting group from the 3-position when the ethynylation process is complete and then reintroduce it at the same time that the blocking group is introduced at the 17-position.

The following examples are presented to further illustrate the presence invention. They should not be construed as limiting it in any way. In these examples, quantities are indicated in parts by weight unless parts by volume are specified, and temperatures are indicated in degrees centigrade (° C.). The relationship between parts by weight and parts by volume is the same as that existing between grams and milliliters.

EXAMPLE 1

To 76.0 parts of dehydroisoandrosterone there is added a solution of 32.0 parts of butyl vinyl ether in 66 parts of tetrahydrofuran followed at once by 0.5 parts by volume of a catalyst solution prepared from 0.2 parts by volume of methanesulfonic acid and 1.8 parts by volume of tetrahydrofuran. The mixture is swirled and maintained at about 22° C. for a total of 40 minutes. The methanesulfonic acid is then neutralized by the addition of 0.4 part of triethylamine. There is thus obtained a tetrahydrofuran solution of 3β-(1-butoxyethoxy)androst-5-en-17-one which is used directly in the next step without isolation.

EXAMPLE 2

To a flask maintained under nitrogen, there is first added 80 parts of potassium hydroxide followed by 185 parts of tetrahydrofuran. The mixture is then stirred and 16 parts of ethanol is added. Heat is evolved, the temperature rises to about 40° C., and the mixture is stirred at 35–40° C. for 30 minutes. The mixture is then cooled to about −10° C. and acetylene is bubbled into the solution below the surface of the liquid until the mixture is nearly saturated with the gas. This process requires about 10–15 minutes.

Then, the solution of 3β-(1-butoxyethoxy)-androst-5-en-17-one in tetrahydrofuran, prepared in Example 1, is added to the mixture over a period of 15–17 minutes. Additional small quantities of tetrahydrofuran are used to make sure that all of the butoxy-ethoxy compound is rinsed into the reaction mixture. The mixture is then stirred at about −10° C. for 90 minutes while a slow stream of acetylene is bubbled in to make sure that the mixture is saturated with acetylene. During this time, the mixture becomes semi-solid.

After the indicated 90 minutes, the acetylene flow is terminated and nitrogen is again passed through the system. The reaction is quenched by the addition of a mixture of 75 parts of glacial acetic acid and 115 parts of water. This material is delivered as close to the stirrer shaft as possible. The mixture fizzes and evolves acetylene and eventually the solid breaks up and dissolves. During this time, cooling is used to keep the mixture below 10° C. After the addition of the acid is complete, 80 parts of hexane is added and the mixture is warmed to 25° C. with stirring. The aqueous layer is then separated from the mixture and extracted twice with small portions of tetrahydrofuran. These tetrahydrofuran extracts are combined with the original solution which is then dried with a small amount of anhydrous potassium carbonate. The tetrahydrofuran solution is then filtered through a small amount of diatomaceous earth.

The solvent is then distilled from the filtrate at atmospheric pressure and final traces of solvent are removed under reduced pressure. The remaining oily residue is dissolved at once in 200 parts of acetone and cooled to 25° C. with stirring. Shortly after crystallization begins, 800 parts of water is added, the first portion being added slowly. The mixture is then cooled at 5–10° C. for 30 minutes before it is filtered; the separated solid is washed well with cold water and then dried in an oven at 85–90° C. There is thus obtained 106–109 parts of 3β-(1-butoxyethoxy) - 17α-ethynylandrost-5-en-17β-ol melting at about 115–121° C. This compound has the following formula

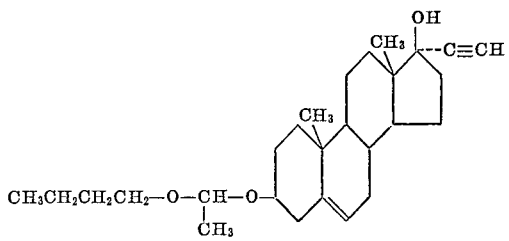

EXAMPLE 3

A solution of 32 parts of butyl vinyl ether in 63 parts of tetrahydrofuran is placed in a flask under a nitrogen atmosphere and stirred gently. To this solution is added 109.1 parts of 3β-(1-butoxyethoxy)-17α-ethynylandrost-5-en-17β-ol, and 36 parts of tetrahydrofuran is used to rinse in all of the steroid. Then, 0.6 part by volume of a catalyst solution prepared from 0.2 part by volume of methanesulfonic acid and 1.8 parts by volume of tetrahydrofuran is added. The mixture is then stirred gently at 20–22° C. for 70 minutes. The steroid dissolves during this time. At the end of the 70 minutes, the reaction is quenched by the addition of 0.4 part of triethylamine. The resulting solution is then diluted with an additional 89 parts of tetrahydrofuran to give a tetrahydrofuran solution of 3β,17β-bis(1-butoxyethoxy)-17α-ethynylandrost-5-ene.

EXAMPLE 4

The solution obtained in Example 3 is placed under a nitrogen atmosphere and then heated to 50° C. with stirring. Nitrogen flow and heating is discontinued as 133 parts by volume of a 3 M solution of methylmagnesium chloride in tetrahydrofuran is added over a 5-minute period. The temperature of the solution rises to about 60° C. during this time and gas evolution is vigorous. After the addition of the Grignard reagent is complete, the mixture is heated at reflux for 1 hour to ensure complete reaction of the ethynyl compound. Heating is then discontinued, nitrogen flow is resumed, and the mixture is cooled to 5° C. in an ice bath. Carbon dioxide gas, obtained from the sublimation of solid carbon dioxide in a separate vessel, is then introduced below the surface of the reaction mixture. The temperature of the mixture rises gradually from about 5° to about 25° C. as carbon dioxide is absorbed. A cooling bath is used to keep the temperature from going above 25° C. but once the temperature begins to fall, the mixture is warmed back to 25° C. by external heating and maintained at that temperature for 15–20 minutes to ensure complete carboxylation.

The reaction system is then vented to the atmosphere and 90 parts by volume of 2-methyl-2,4-pentanediol is added. The temperature rises to 32–34° C. and a crystalline solid precipitates within a minute or two. Then, a mixture of 48 parts of concentrated hydrochloric acid and 140 parts of water is added to the reaction mixture with stirring. The addition is done rapidly and the solution quickly warms to about 40° C. as the first part of the acid is added and then remains at about that temperature. Shortly after the addition of the acid is complete, the temperature begins to rise again, this time reaching about 43–45° C. The resulting acidic solution is maintained at 35–45° C. for 30 minutes while it is stirred vigorously to keep the organic and aqueous layers well mixed. The mixture is then cooled and the aqueous layer is separated and discarded. The tetrahydrofuran layer is washed with 100 parts by volume of saturated sodium chloride solution that has been diluted with 20 parts of water. The clear lower aqueous layer is again separated and discarded and washing is repeated with a fresh wash solution. The tetrahydrofuran solution is then dried over a small amount of anhydrous magnesium sulfate to remove suspended water. The solution is then stirred with a small amount of diatomaceous earth and filtered through diatomaceous earth to give a clear solution. To this solution is added 35 parts of triethylamine over a period of 20–25 minutes with stirring. A solid separates gradually and the mixture becomes thick. It is stirred for 15 minutes, cooled to about 10° C., and stirred at this temperature for 30 minutes. The solid is then separated by filtration and washed well with tetrahydrofuran. It is finally dried overnight at 85–90° C. to give 114–115 parts of the triethylamine salt of 3-(3$\beta$,17$\beta$-dihydroxyandrost-5-en-17$\alpha$-yl)propiolic acid.

EXAMPLE 5

A solution is prepared from 115 parts of the triethylamine salt of 3-(3$\beta$,17$\beta$-dihydroxyandrost-5-en-17$\alpha$-yl)propiolic acid and 412 parts of methanol containing 8.4 parts of triethylamine. The solution is added to 5.8 parts of 5% palladium-on-calcium carbonate catalyst that has been wetted with 41 parts of tetrahydrofuran. The solution is placed in a hydrogenation bomb fitted with a stainless steel cooling coil and hydrogen pressure is maintained at about 2.5–3 lbs. per square inch during the reduction. Before the contents of the bomb are stirred to initiate the hydrogenation, the solution is cooled to 10–12° C. by circulating ice water through the coil. After the first mole of hydrogen has been absorbed, the cooling water is turned off and the temperature of the mixture is allowed to rise to 25° C. while the second mole of hydrogen is absorbed. Most of the hydrogen is absorbed during the course of 1 hour but the mixture is stirred with hydrogen for an additional 2 hours to ensure a complete reduction. The catalyst is then removed by filtration and rinsed well with methanol. The resulting filtrate, which has a volume slightly less than twice the original volume, is diluted with 340 parts of 2-propanol, and 38 parts of concentrated hydrochloric acid is added. Solid separates as the acid is added but this dissolves rapidly when the mixture is heated to boiling to distill off the organic solvents. As solvent distillation continues, a crystalline solid begins to separate from the mixture. Then, 800 parts of water is added slowly as the distillation proceeds. Distillation is continued until only water is distilling. The mixture is then cooled in an ice bath and the solid which forms is separated by filtration and washed well with water. It is dried to constant weight in an oven at 85° C. to give 85.5–86 parts of 3-(3$\beta$,17$\beta$-dihydroxyandrost-5-en-17$\alpha$-yl) propionic acid $\gamma$-lactone.

This product can be further purified by refluxing it with 345 parts of methanol for one hour, cooling the mixture to 5–10° C., and separating the solid which forms by filtration. The solid is rinsed with cold methanol, dried in air at 25° C., and then dried to constant weight in an oven at 85° C. to give 81–82 parts of pure 3-(3$\beta$,17$\beta$-dihydroxyandrost-5-en-17$\alpha$-yl)propionic acid $\gamma$-lactone. The product melts at 191–194° C. in a sealed, evacuated capillary tube.

EXAMPLE 6

If the series of reactions described in Examples 1–5 is repeated using ethyl vinyl ether or isobutyl vinyl ether in place of the butyl vinyl ether used in the steps described in Examples 1 and 3,3-(3$\beta$,17$\beta$-dihydroxyandrost-5-en-17$\alpha$-yl)propionic acid $\gamma$-lactone is obtained in high yield in each case. In each instance, the corresponding 3$\beta$-(1-ethoxyethoxy)- or 3$\beta$ - (1 - isobutoxyethoxy)-compounds and 3$\beta$,17$\beta$-bis(1-ethoxyethoxy)- or 3$\beta$,17$\beta$ - bis(1 - isobutoxyethoxy)-compounds are obtained.

Methyl vinyl ether is also used in the same series of reactions and gives similar results. The tetrahydrofuran solutions used in steps 1 and 3 (corresponding to Examples 1 and 3) are prepared using gaseous methyl vinyl ether.

What is claimed is:
1. A process for the preparation of 3-(3$\beta$-17$\beta$-dihydroxyandrost-5-en-17$\alpha$-yl)propionic acid $\gamma$-lactone which comprises:
(a) reacting dehydroisoandrosterone with a (lower alkyl) vinyl ether in the presence of an acid catalyst to give a 3$\beta$-[1-(lower alkoxy)ethoxy]androst-5-en-17-one;
(b) ethynylating the ketone to give the corresponding 17$\alpha$-ethynyl-17$\beta$-hydroxy compound;
(c) treating this 17$\beta$-hydroxy compound with a (lower alkyl) vinyl ether in the presence of an acid catalyst to give the corresponding 3$\beta$,17$\beta$-bis[1-lower alkoxy)ethoxy]-17$\alpha$-ethynylandrost-5-ene;
(d) treating the resultant compound with a reagent selected from the group consisting of a Grignard reagent and lithium alkyl followed by carbonation to give the corresponding propiolic acid;
(e) hydrolyzing the compound under mineral acid conditions to give 3-(3$\beta$,17$\beta$-dihydroxyandrost-5-en-17$\alpha$-yl)propiolic acid;
(f) catalytic reduction of the propiolic acid followed by acidification to give the desired 3-(3$\beta$,17$\beta$-dihydroxyandrost-5-en-17$\alpha$-yl)propionic acid $\gamma$-lactone.

2. A process for the preparation of 3-(3$\beta$,17$\beta$-dihydroxyandrost-5-en-17$\alpha$-yl)propionic acid $\gamma$-lactone according to claim 1 which comprises:
(a) reacting dehydroisoandrosterone with a (lower alkyl) vinyl ether in the presence of an acid catalyst to give a 3$\beta$-[1-(lower alkoxy)ethoxy]androst-5-en-17-one;
(b) treating the resulting ketone with potassium hydroxide and acetylene to give the corresponding 17$\alpha$-ethynyl-17$\beta$-hydroxy compound;
(c) reacting the resulting 17$\beta$-hydroxy compound with a (lower alkyl) vinyl ether in the presence of an acid catalyst to give the corresponding 3$\beta$,17$\beta$-bis[1-lower alkoxy)ethoxy]-17$\alpha$-ethynylandrost-5-ene;
(d) treating this ethynyl compound with methyl magnesium chloride and then with carbon dioxide to give the corresponding propiolic acid;
(e) treating the propiolic acid with a mineral acid to remove the protecting groups at the 3- and 17-positions; and
(f) hydrogenating the resulting propiolic acid using palladium-on-calcium carbonate as a catalyst to give the desired product.

3. A process for the preparation of 3-(3$\beta$,17$\beta$-dihydroxyandrost-5-en - 17$\alpha$ - yl)propionic acid $\gamma$-lactone according to claim 1 which comprises:
(a) reacting dehydroisoandrosterone with butyl vinyl ether in the presence of an acid catalyst to give 3$\beta$-(1-butoxyethoxy)androst-5-en-17-one;
(b) reacting this ketone with potassium hdyroxide and acetylene to give the corresponding 17$\alpha$-ethynyl-17$\beta$-hydroxy compound;
(c) reacting the resulting 17-hydroxy compound with butyl vinyl ether in the presence of an acid catalyst to give 3β,17β - bis(1 - butoxyethoxy) - 17α-ethynylandrost-5-ene;

(d) treating the bis(butoxyethoxy)compound first with methylmagnesium chloride and then with carbon dioxide to give 3-[3β,17β - bis(1 - butoxyethoxy) androst-5-en-17α-yl]propiolic acid;

(e) removing the two protecting groups by treating the propiolic acid with a mineral acid; and (f) hydrogenating the propiolic acid with palladium-on-calcium carbonate catalyst to give the desired 3-(3β,17β-dihydroxyandrost-5-en-17α-yl)propionic acid γ-lactone.

4. A process for the preparation of 3-(3β,17β-dihydroxyandrost-5-en-17α-yl)propiolic acid according to claim 1 which comprises:

(a) reacting dehydroisoandrosterone with butyl vinyl ether in the presence of an acid catalyst to give 3β-(1-butoxyethoxy)androst-5-en-17-one;

(b) reacting this ketone with potassium hydroxide and acetylene to give the corresponding 17α-ethynyl-17β-hydroxy compound;

(c) reacting the 17β-hydroxy compound with butyl vinyl ether in the presence of an acid catalyst to give 3β,17β-bis(1-butoxyethoxy)-17α-ethynylandrost-5-ene;

(d) treating the bis(butoxyethoxy) compound first with methylmagnesium chloride and then with carbon dioxide to give 3-[3β,17β - bis(1 - butoxyethoxy) androst-5-en-17α-yl]propiolic acid; and (e) removing the two protecting groups by treating the propiolic acid with hydrochloric acid to give the desired 3-(3β,17β-dihydroxyandrost - 5 - en - 17α-yl) propiolic acid.

5. A compound of the formula

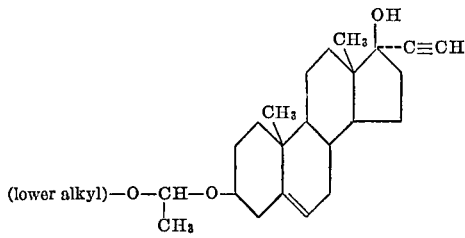

6. A compound according to claim 5 which is 3β-(1-butoxyethoxy)-17α-ethynylandrost-5-en-17β-ol.

7. A compound of the formula

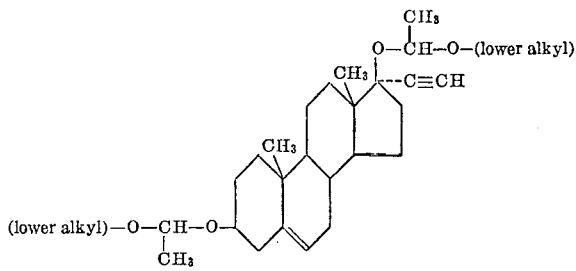

8. A compound according to claim 7 which is 3β,17β-bis(1-butoxyethoxy)-17α-ethynylandrost-5-ene.

9. A compound of the formula

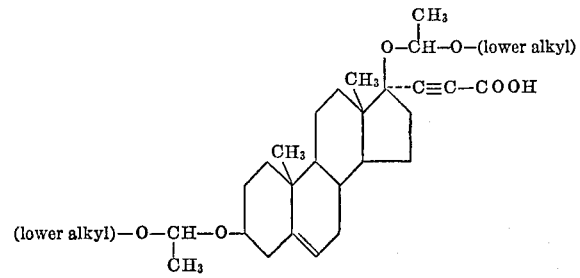

10. A compound according to claim 9 which is 3-[3β,17β-bis(1-butoxyethoxy)androst-5 - en - 17α-yl]propiolic acid.

11. 3β-(1-butoxyethoxy)androst-5-en-17-one.

References Cited
UNITED STATES PATENTS

| | | | |
|---|---|---|---|
| 3,576,889 | 4/1971 | Martin et al. | 260—638 |
| 3,636,012 | 1/1972 | Barcza | 260—397.4 |

ELBERT L. ROBERTS, Primary Examiner

U.S. Cl. X.R.

260—397.1, 397.4, 397.5

UNITED STATES PATENT OFFICE
CERTIFICATE OF CORRECTION

Patent No. 3,738,983     Dated June 12, 1973

Inventor(s) Hugh L. Dryden, Jr. and Joseph J. Weiczorek

It is certified that error appears in the above-identified patent and that said Letters Patent are hereby corrected as shown below:

Column 1, line 15, "N-lactose" should be -- γ-lactone --;

Column 1, line 33, "lactose" should be -- lactone --;

Column 1, line 39, "lactose" should be -- lactone --;

Column 1, line 42, "lactose" should be -- lactone --;

Column 2, line 31, "en17β" should be -- en-17β --;

Column 3, line 21, "presence" should be -- present --;

Column 6, line 21, dehdyroisoandrosterone" should be -- dehydroisoandrosterone --; and Column 6, line 71, "hdyroxide" should be -- hydroxide --.

Signed and sealed this 9th day of April 1974.

(SEAL)
Attest:

EDWARD M. FLETCHER, JR.
Attesting Officer

C. MARSHALL DANN
Commissioner of Patents